(12) United States Patent
Thomson et al.

(10) Patent No.: US 6,189,044 B1
(45) Date of Patent: Feb. 13, 2001

(54) DYNAMIC ROUTING METHOD FOR PACKET SWITCHED SATELLITE COMMUNICATIONS

(75) Inventors: Louisa Thomson, Manhattan Beach; Gregory Nakanishi, Torrance, both of CA (US)

(73) Assignee: Hughes Electronics Corporation, El Segundo, CA (US)

( * ) Notice: Under 35 U.S.C. 154(b), the term of this patent shall be extended for 0 days.

(21) Appl. No.: 09/173,256

(22) Filed: Oct. 14, 1998

(51) Int. Cl.[7] .................................................. G06F 13/00
(52) U.S. Cl. ........................... 709/242; 709/241; 370/238
(58) Field of Search .................................. 370/235, 238, 370/237; 709/233, 234, 235, 241, 242; 714/18

(56) References Cited

U.S. PATENT DOCUMENTS

| | | | |
|---|---|---|---|
| 5,327,426 | * 7/1994 | Dolin, Jr. et al. | 370/235 |
| 5,664,091 | * 9/1997 | Keen | 714/18 |
| 5,684,800 | * 11/1997 | Dobbins et al. | 370/401 |
| 5,781,534 | * 7/1998 | Perman et al. | 370/248 |
| 5,946,308 | * 8/1999 | Dobbins et al. | 370/392 |
| 5,968,129 | * 10/1999 | Dillon et al. | 709/233 |
| 6,044,402 | * 3/2000 | Jacobson et al. | 709/225 |
| 6,094,687 | * 7/2000 | Drake, Jr. et al. | 709/241 |

* cited by examiner

Primary Examiner—Kenneth R. Coulter
(74) Attorney, Agent, or Firm—Vijayalakshmi D. Duraiswamy; Michael W. Sales

(57) ABSTRACT

A method of routing data packets in a communication network having one or more intelligent routing nodes. Each routing node maintains routing and address resolution information for all nodes within the routing node's domain. Upon detecting a data transmission from a source node to a destination node using a sub-optimal path. The routing node communicates updated routing information to the source node. The source node stores this information such that the subsequent data packets containing the same network address can be transmitted from the source node to the destination node in a single hop.

9 Claims, 5 Drawing Sheets

DYNAMIC ROUTING METHOD FOR PACKET SWITCHED SATELLITE COMMUNICATIONS

TECHNICAL FIELD

The invention relates to network communications and, more particularly, to a method of routing data packets within a satellite communications network.

BACKGROUND OF THE INVENTION

In a full mesh network such as a satellite network, it is possible for a source node to communicate with a destination node in a single hop. Single hop communications are possible when the source node has knowledge of both the network address of the destination node and the physical address of the destination node. Existing methods of distributing address information to the nodes within a network make use of dynamic routing protocols and address resolution protocols. These protocols can generally be classified as either broadcast-based or server- based protocols.

Broadcast based protocols transmit routing and address resolution information to all nodes within the network on a periodic basis. Because all routing information is distributed throughout the entire network on a periodic basis, broadcast-based implementations tend to be very bandwidth intensive.

Server-based protocols are based on the concept of an intelligent server having all routing and address resolution information for the entire network. To send information from a source node to a destination node, the source node requests routing information from the intelligent server. In response, the server transmits routing information back to the source node. Once the source node receives the address resolution information for the destination node, it transmits the data directly to the destination node. The process is then repeated for each subsequent communication. Such server-based communication methods increase the number of protocol exchanges, thereby increasing delays within the system.

The bandwidth usage associated with broadcast-based systems and the communications delay associated with server-based systems are both undesirable in a bandwidth-sensitive and delay-sensitive wireless environment such as a geostationary satellite network.

DISCLOSURE OF THE INVENTION

The present invention overcomes the drawbacks of these prior art systems through the provision of one or more intelligent routing nodes which maintains routing and address resolution information for all nodes within the routing node's domain. When the intelligent routing node detects that a source node is transmitting a data packet using a sub-optimal communication path, the routing node communicates updated routing information to the source node to improve the communication path.

When a source node transmits a data packet to the routing node, the routing node senses the network address of the destination node, retransmits the data packet to the destination node at the physical address associated with the destination node, and redirects the destination node physical address to the source node. The source node then stores this information such that subsequent data packets containing the same network address can be transmitted directly by the source node to the destination node.

The present invention provides an improved network communications system and method. The present invention also minimizes bandwidth usage and communications delay within a network.

BRIEF DESCRIPTION OF THE DRAWINGS

For a more complete understanding of the invention, reference should now be had to the embodiments illustrated in greater detail in the accompanying drawings and described below by way of examples of the invention.

In the drawings.

While the invention will be described in connection with one or more embodiments, it will be understood that the invention is not limited to those embodiments. On the contrary, the invention covers all alternatives, modifications, and equivalents as may be included within the spirit and scope of the appended claims.

DETAILED DESCRIPTION OF THE INVENTION

The communications network of the present invention groups communication nodes by network addresses into routing domains where a single node serves as the routing node for all other nodes in the domain. The routing node is designated as the default routing node for all the nodes in the domain.

Figure 1:
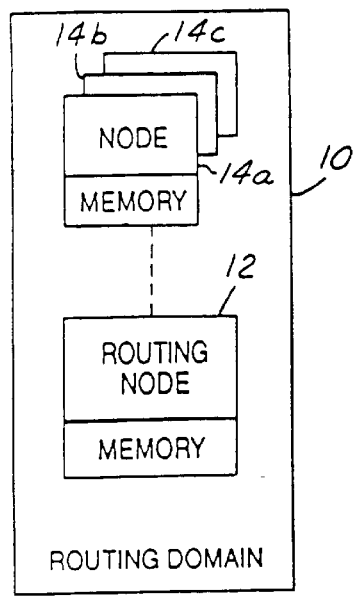
FIG. 1 is a block diagram of a communications network according to the present invention.

Referring to FIG. 1, a routing domain 10 is shown including a routing node 12 and a plurality of communication nodes 14a, 14b, 14c each having associated memory. Although only one routing domain 10 is shown in FIG. 1, there may be multiple routing domains within the network, wherein each routing domain includes an associated routing node. The role of the routing node 12 is to distribute optimal routing information to the communication nodes 14a, 14b, 14c in the network when sub-optimal communication pathways are detected. A redirecting message containing updated address information for the optimal route is transmitted by the routing node 12 to the source node when the optimal communication pathway is unknown to the source node. This routing logic is illustrated in FIGS. 3 and 4.

Routing the optimal communications pathway to the source nodes allows for subsequent single-hop communications, thus providing the performance of a full-mesh interconnected network without the associated delays of a server-based network or bandwidth requirements of a broadcast-based network.

Figure 2:
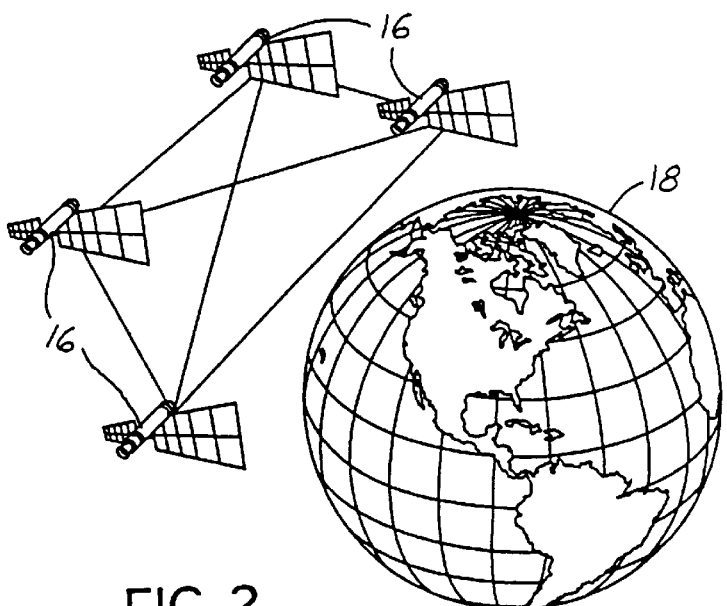
FIG. 2 illustrates a full mesh interconnected satellite system according to the present invention.

FIG. 2 illustrates an example of a full-mesh interconnected satellite communication system wherein a network of satellites 16 are in operative communication with each other in orbit about the earth 18.

Figure 3:
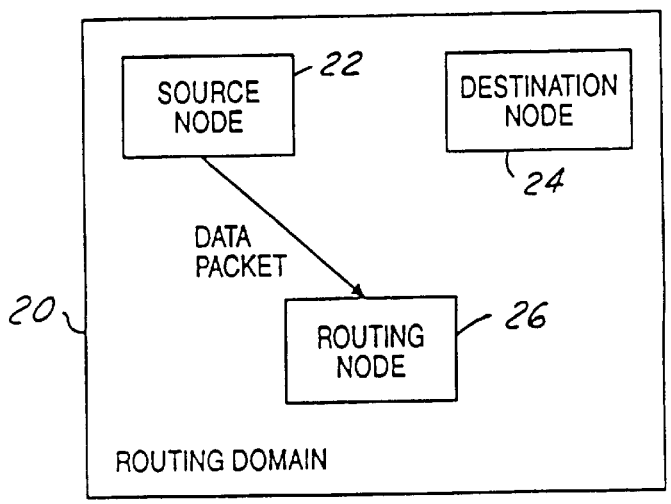
FIG. 3 is a block diagram of a source node transmitting data to a routing node within the communications network of FIG. 1.
Figure 4:
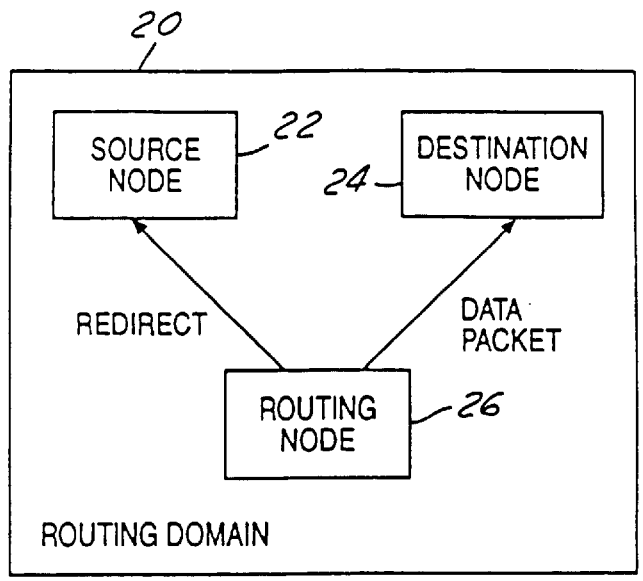
FIG. 4 is a block diagram illustrating the routing node data transmissions for the communications network of FIG. 3.

In FIG. 3, there is shown a routing domain 20, including a source node 22, destination node 24, and routing node 26, each having associated memory. Each data packet to be transmitted within the network comprises data and the network address of the destination node that is to receive the data packet. The memory associated with each node allows the nodes to store network address and physical address resolution information. When a data packet is received by the source node 22, it is processed to retrieve the network address of the destination node 24 where the data packet is to be sent. Given the network address, the source node searches its memory to determine whether is has a route, i.e., a physical address, to the destination node 24 associated with the data packet information. If the route to the network address is unknown, the source node 22 forwards the data packet to its default routing node 26.

Routing node 26 performs address management tasks and maintains routing information for all nodes within the routing domain 20. If the destination node 24 is within the routing domain 20 of the default routing node 26, the data packet is forwarded to the destination node 24 as shown in FIG. 4. Because a non-optimal communication pathway is being used between the source node 22 and the destination node 24, the routing node 26 also transmits a redirect message to the source node 22. The redirect message contains updating routing and physical address information for the destination node 24. The source node 22 stores this information in its memory, such that subsequent data packets having the same network address can be transmitted directly to the destination node 24 at the physical address associated with the network address contained in the data packet.

Figure 5:
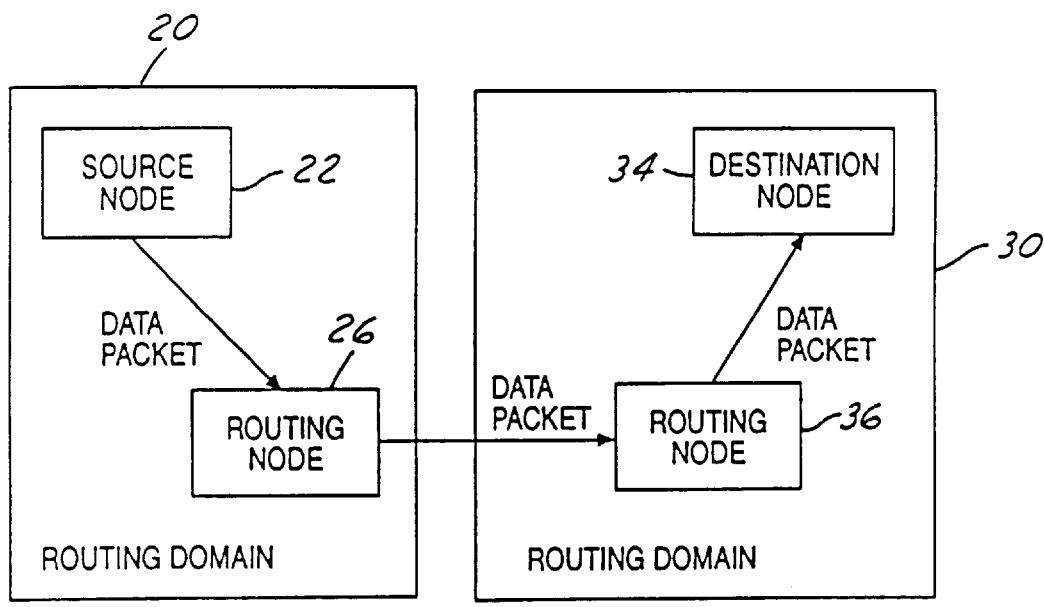
FIG. 5 is a block diagram depicting inter-domain data transmission according to the present invention.
Figure 6A:
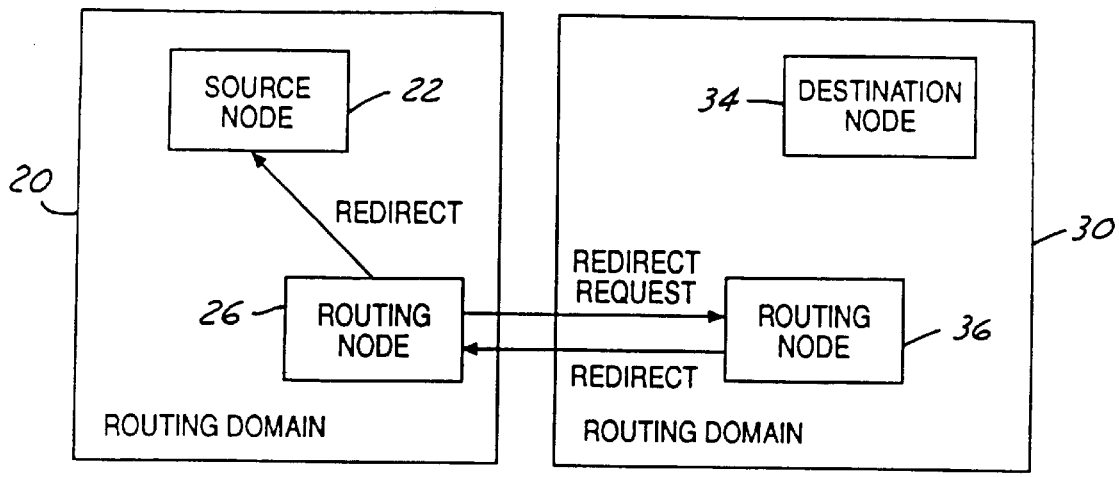
FIGS. 6A and 6B are block diagrams depicting alternate methods of redirecting address resolution information to a source node according to the present invention.
Figure 6B:
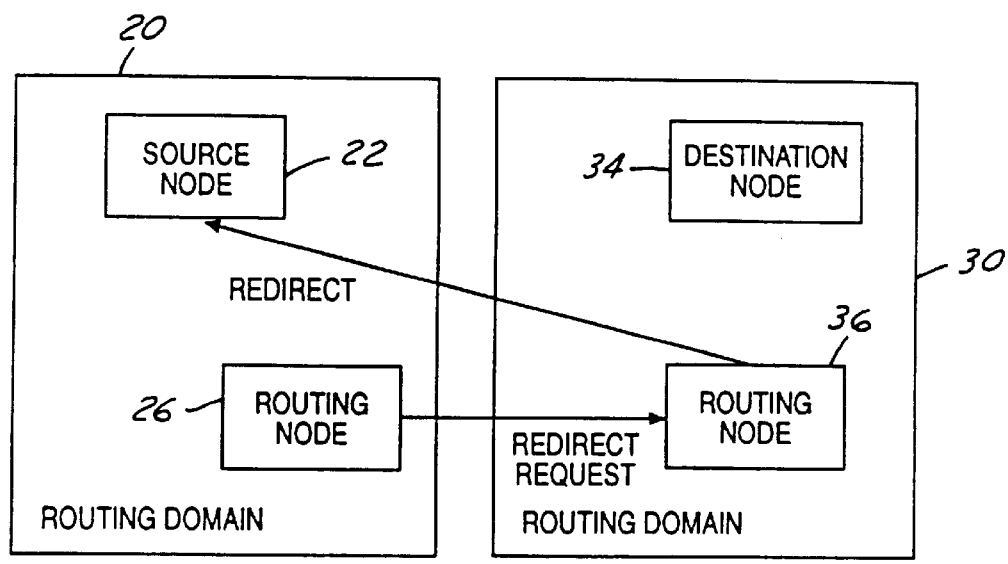

FIGS. 5, 6a, and 6b illustrate the routing logic when the destination node is outside of the default routing node's domain. In FIG. 5, when the source node 22 receives a data packet containing a destination node network address and the source node memory does not have an associated physical address, the data packet is forwarded to the default routing node 26 as before. The routing node 26 then processes the network address to determine whether the destination node associated with the physical address is located within the domain 20 of the routing node 26. If the routing node 26 does not know the physical address for the desired destination node, it forwards the data packet to the routing node 36 within the routing domain 30 where the destination node 34 resides. Thereafter, the routing node 36 retransmits the data packet to the destination node 34 within the routing domain 30.

Figure 7A:
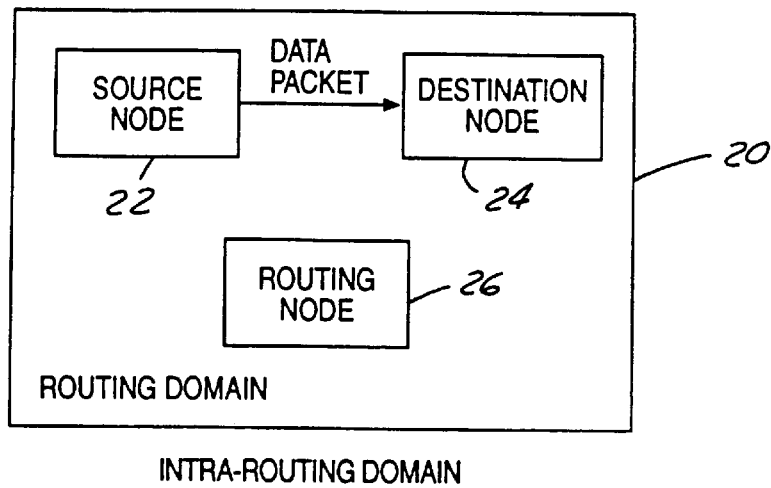
FIGS. 7A and 7B are block diagrams showing the optimum communications pathway from a source node to a destination node within a network according to the present invention.
Figure 7B:
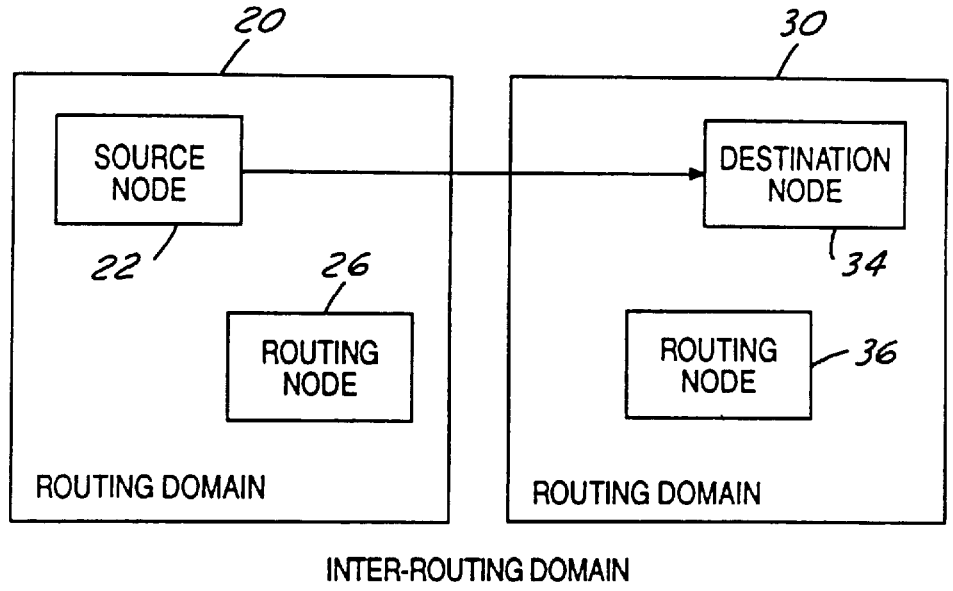

FIGS. 6a and 6b illustrate two alternatives for the redirect messaging related to the data packet transmission shown in FIG. 5. As before, the redirecting message is sent to the source node 22, however the redirecting message can be sent by either the routing node 36 associated with the destination node domain 30 or the routing node 26 associated with the source node domain 20. Once the updated routing information is processed by the source node 22, data packets can be transmitted directly from the source node 22 to the desired destination node as shown in FIGS. 7a and 7b.

Figure 8:
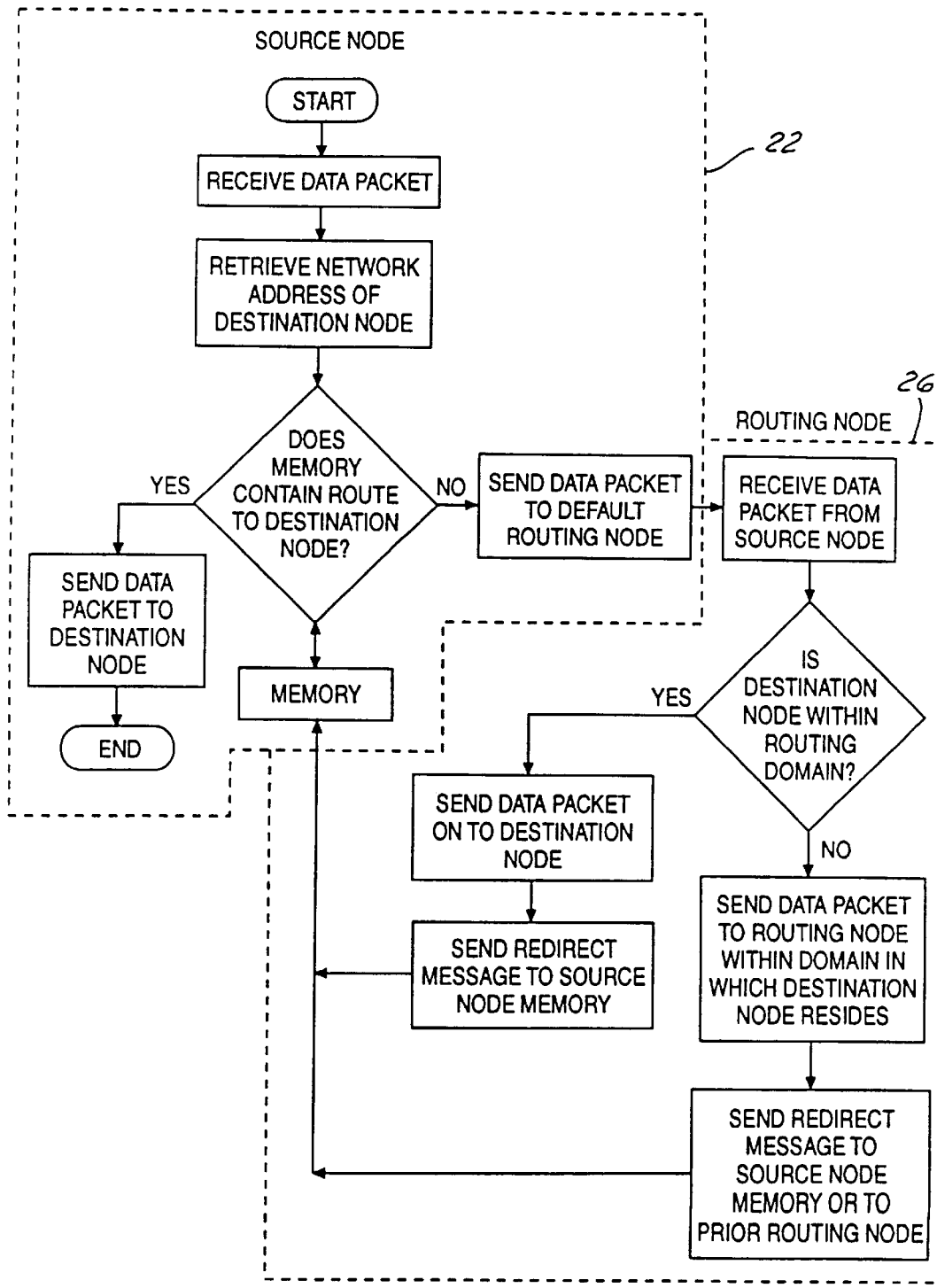
FIG. 8 shows the routing logic of the present invention in flowchart form.

FIG. 8 depicts the routing logic of the present invention in flow-chart form. The logic enclosed in box 40 describes the processes undertaken within the source node 22 to transmit a received data packet, and the logic within box 50 describes the processes undertaken within the routing node 26 to transmit the data packet received at the source node.

From the foregoing, it will be seen that there has been brought to the art a new and improved network communications system and method which minimizes bandwidth usage and latency associated with broadcast and server-based communications systems.

While particular embodiments of the invention have been shown, it will be understood, of course, that the invention is not limited thereto since modifications may be made by those skilled in the art, particularly in light of the foregoing teachings. For example, although the invention has been described with reference to a satellite communications system, the network routing logic of the present invention is equally applicable to a computer network. The invention, therefore, includes all alternatives, modifications, and equivalents as may be included within the spirit and scope of the appended claims.

What is claimed is:

1. A method of routing data packets in a network having a routing node, a source node and a destination node, each of said nodes having an associated network address and physical address, said routing node including memory containing the network and physical addresses for all other nodes within the network, each of said data packets including a destination node network address, the method comprising the steps of:

receiving a data packet into said source node, said source node sensing the destination node network address of said data packet;

said source node transmitting said data packet to said routing node;

said routing node sensing the destination node network address within said data packet, re-transmitting said data packet to said destination node at said physical address associated with said network address within said data packet, and transmitting said destination node physical address to said source node; and said source node storing and associating said destination node physical address with said destination node network address such that subsequent data packets containing said same destination node network address are transmitted directly by said source node to said destination node at said destination node physical address.

2. The method of claim 1 wherein said network comprises a plurality of source nodes and destination nodes.

3. The method of claim 2 wherein said network is a satellite communication network.

4. A method of routing data packets in a network having a first domain including a source node and a first routing node, and a second domain including a destination node and second routing node, each of said routing, source and destination nodes having an associated network address and physical address, each routing node including memory containing the network and physical addresses for each node within its domain and the network addresses known to said other routing node, the method comprising the steps of:

(a) receiving a data packet into said source node, said data packet including a destination node network address associated with said destination node;

(b) said source node transmitting said data packet to said first routing node;

(c) said first routing node sensing the destination node network address within said data packet, re-transmitting said data packet to said second routing node, and requesting from said second routing node, said destination node physical address;

(d) said second routing node re-transmitting said data packet to said destination node, and transmitting said destination node physical address to said source node; and (e) said source node storing and associating said destination node physical address with said destination node network address such that subsequent data packets containing said same destination node network address are transmitted directly by said source node to said destination node at said destination node physical address.

5. The method of claim 4 wherein said step (d) comprises said second routing node re-transmitting said data packet to said destination node, and transmitting said destination node physical address to said first routing node, said first routing node re-transmitting said destination node physical address to said source node.

6. A method of routing data packets within a satellite communication network having a plurality of domains, each of said domains including a plurality of source and destination nodes and a routing node, each of said routing, source and destination nodes having an associated network address and physical address, each of said routing nodes including memory containing the network and physical addresses for all nodes within its domain and the network addresses known to each other routing node, each of said data packets including a destination node network address, the method comprising the steps of:

receiving a data packet into a source node and sensing the destination node network address of said data packet and, if said source node associates said destination node network address with a physical address, then transmitting said data packet to a destination node at said physical address associated with said network address, otherwise transmitting said data packet to said routing node within the domain of said source node;

said routing node sensing the destination node network address within said data packet and, if said destination node associated with said network address is within said routing node domain, then re-transmitting said data packet to said destination node at said physical address associated with said network address and transmitting said destination node physical address to said source node, otherwise determining said other domain where said destination node resides and re-transmitting said data packet to said other routing node in said other domain;

said other routing node sensing the destination node network address within said data packet and, re-transmitting said data packet to said destination node within its domain at said physical address associated with said network address and transmitting said destination node physical address to said source node;

said source node storing and associating said destination node physical address with said destination node network address such that subsequent data packets containing said destination node same network address are transmitted directly by said source node to said destination node at said destination node physical address.

7. The method of claim 6 wherein said step (c) comprises said other routing node sensing the destination node network address within said data packet and, re-transmitting said data packet to said destination node within its domain at said physical address associated with said network address and transmitting said destination node physical address to said routing node within said domain of said source node, said routing node re-transmitting said destination node physical address to said source node.

8. A network system for routing data packets having a destination node network address, comprising:

a plurality of source nodes and destination nodes each of said source and destination nodes having an associated network address and physical address and a memory for storing data packets, address information, and routing logic; and a routing node having memory containing routing logic and the network address and physical address of each source node and destination node within the network, wherein said routing logic senses the destination node network address of a data packet received by said source node and causes said source node to transmit said data packet to said routing node wherein said routing node re-transmits said data packet to said destination node at said physical address associated with said network address within said data packet, and transmits said destination node physical address to said source node such that subsequent data packets containing said same destination node network address are transmitted directly by said source node to said destination node at said destination node physical address.

9. The system of claim 8 wherein said network is a satellite communications network.

* * * * *